Patented Dec. 15, 1936

2,063,908

UNITED STATES PATENT OFFICE 2,063,908

AMINO-CARBOXYLIC ACID DERIVATIVES IN WET TREATMENTS

Henry Dreyfus, London, England

No Drawing. Original application August 22, 1932, Serial No. 629,902. Divided and this application October 31, 1933, Serial No. 696,027. In Great Britain September 18, 1931

19 Claims. (Cl. 8—5)

This invention relates to improvements in the wet treatment of materials and more particularly in the wetting, cleansing, sizing, de-electrification and other wet treatments of textile materials, in cleansing broadly, and in the wetting, dispersing and emulsifying of water-insoluble compounds or materials. This application is a divisional of application Serial No. 629,902 filed August 22, 1932.

I have discovered that the compounds obtainable by acidylation and/or esterification of the amino or acid groups of amino acids, and particularly aliphatic amino carboxylic acids and also the salts of these compounds formed either on the amino group or the acid group, whichever is free, are of great value for aqueous treatments of all kinds, and in particular in the wetting, cleansing, sizing, de-electrification, prevention of acid fading of dyestuffs, crêping and other treatments of textile filaments, threads, yarns, fabrics and the like and also in the dispersion, emulsification and wetting of difficultly wettable or water-insoluble substances and materials of all kinds. The dispersions and emulsions so produced are particularly suitable for the dyeing or other treatments for textile materials.

The parent amino acids for the manufacture of the agents to be used for wetting, emulsifying and other purposes may, for example, be simple amino acids, as for example glycine, α- and β-alanines, α-amino isobutyric acid, ornithine (α-δ-di-amino-valeric acid), valine (α-amino-isovaleric acid), lysine (α-ε-di-amino-capronic acid), leucine (α-amino-γ-methyl-butyric acid), or the derivatives of such acids, as for example the N-alkyl derivatives, e. g. sarkosin (N-methyl glycine), butyl-glycine, including carboxy alkyl derivatives of amino acids, as for instance di-glycol amino acid (carboxy methyl glycine) and oxy derivatives, as for example serine (α-amino-β-oxy-propionic acid).

The amino acids obtained from paraffins and from tar and coal hydrogenation products, for example by chlorinating the oxidation products of such hydrocarbon bodies followed by amidation with amino or substituted amino (e. g. methylamino) groups, and the amino acids obtainable by reduction of the products obtained by treating said hydrocarbons with nitrogen oxides are also of value as the parent amino acids for the manufacture of the compounds employed in the present invention.

The amino acids may be converted into the compounds for use according to the present invention by acidylation of the amino group, particularly with higher fatty acid radicles, for instance radicles containing 8 and preferably 12, 16 or more carbon atoms or by naphthenic acid radicles or resin acid radicles. Valuable results are obtained, for example by introducing the radicles of lauric, stearic, palmitic and oleic acids among the fatty acids, naphthenic acids and the resin acids of colophony, Congo copal, kauri copal, Manila copal and Zanzibar copal, and the synthetic resin acids, for example those obtainable by condensation of natural resins with phenol-aldehyde condensation products and with other synthetic resin products, as for example the glyptal and urea-aldehyde synthetic products and the products obtained from aliphatic di-carboxylic acids, e. g. sebacic acid, by condensation with alcohols, and in addition the purely synthetic resins containing a free carboxy group, for example the products obtained by condensation of salicylic acid or other phenol carboxylic acids with formaldehyde or other aldehydes. The acidylation may be effected by treatment of the amino acid with the free acid or an ester thereof, e. g. a glyceride, or with the acid chloride or anhydride. The compounds for use in the present invention may further be obtained by esterification of the carboxy groups of the amino acids and particularly esterification by means of higher alcohol radicles, as for example iso-amyl alcohol, cetyl alcohol or myricyl alcohol. The simple methyl or ethyl esters of the amino acids are of comparatively small value according to the present invention, and the higher alcohol esters, as for instance the isobutyl, isoamyl and higher esters have a much greater wetting, emulsifying, or dispersing power. Compounds for use in this invention may further be obtained by acidylation of the amino groups and esterification of the acid groups.

It is found that the wetting, emulsifying and dispersing power increases with the number of carbon atoms, and it is advisable in all cases to employ compounds which contain at least 12–16 and preferably 20 or more carbon atoms. These carbon atoms will be partly present in the amino acid itself and partly present in either the acidyl group or the ester group or both. Even when compounds in which the amino acid radicle itself contains a large number of carbon atoms are employed it is advisable that the ester and/or acidyl groups should contain at least 4 carbon atoms, and preferably 8, 10 or more carbon atoms.

The invention includes the use for the purposes stated above not only of the simple acidyl and ester derivatives of the amino acids, but also the mixed acidyl and ester derivatives and the salts of the amino acid esters, for example the salts with hydrochloric acid or other relatively strong acid and also the salts of the acidyl amino acids, for instance the ammonium, sodium or potassium salts and the amino alcohol salts, for instance the salts formed with mono-, di-, and tri-ethanolamine, propanolamine, diamino-propanol, dioxy-propanolamine, butanolamine, pentanolamine and the like and the salts formed with aliphatic diamines, as for instance ethylene diamine.

Instead of using compounds containing ester groups derived from simple alcohols, compounds containing ester groups derived from substituted alcohols may be used, as for instance the amino alcohols mentioned above. In such a case, salts of the compound, formed with both amino groups, may be employed. Similarly, di- or poly-hydric alcohols such as ethylene glycol, propylene glycol, diethylene glycol and glycerine may be used.

Further, the present invention includes the use of the sulphonation products of all the above substances. The sulphonation products are, in general, even more stable towards hard water than are the simple unsulphonated products, and for this reason they are more valuable for use according to the invention.

As previously indicated, the hereinbefore referred to substances are especially of value as wetting, cleansing, emulsifying and dispersing agents and as de-electrifiers in the arts. Some of the substances lend themselves more particularly to one purpose and other substances to other purposes. The products obtained by acidylation of the amino group or groups of an amino acid and also the salts of such products are of great value as dispersing, wetting and cleansing agents. The products obtained by esterification of the carboxy groups of amino acids with an amino alcohol and also the other simpler esters of the amino acids, especially the esters produced by partial esterification of a glycol or other polyhydric alcohol with an amino acid, are of great value as de-electrifiers. They may be used either as such or in the form of salts, for example with hydrochloric acid. The compounds containing free amino groups are especially of value as agents for preventing acid fading of dyestuffs on textile materials, particularly on materials consisting of or containing cellulose acetate or other organic derivatives of cellulose which have been or are to be coloured by means of amino-anthraquinones or alkylamino-anthraquinones.

Furthermore, these agents and also the acidyl amino acids and their salts have pronounced lubricating properties and can therefore be used as lubricants in weaving, knitting, winding or winding and twisting generally, and especially winding or winding and twisting of artificial filaments, for example continuously with their production, either by dry or wet spinning processes. In wet spinning the agents may actually be incorporated in the coagulating bath and may be carried out of the bath by the filaments or like products, so as to exert their lubricating action. Inasmuch as these agents may be used instead of the known lubricants which are subject to oxidation to produce acidic bodies, they may be said to be capable of eliminating the cause of acid fading of dyestuffs on textile materials.

All the compounds of the present invention and more especially the sulphonation products and also the products containing free carboxy groups, whether sulphonated or not, and whether or not the carboxy group has been neutralized with ammonia, caustic soda, caustic potash or other base, may be used as wetting, emulsifying and dispersing agents for difficultly wettable or water-insoluble solids of all kinds. For example, they may be used in the treatment of such solids so as to form pastes, for example printing pastes for use in the colour industry, and in commercial pastes containing vat and other insoluble dyes which have subsequently to be converted into solutions or dispersions. In the textile industries the substances are of value in any wet treatment of textiles, as for example in mercerizing of cotton and other cellulosic fibres, dyeing of fibres of all kinds, the fulling of wool, the carbonizing of cotton and cellulosic fibres, and the killing of skins.

As wetting agents the substances are further of importance in the crêpe twisting of artificial and other filaments or yarns in order to produce crêpe fabrics. It is of great assistance in crêpe twisting to apply water or other wetting substance before twisting or during twisting or between the stages of twisting. The agents employed according to the present invention facilitate such wetting. Furthermore, in the manufacture of staple fibre, using for instance artificial filaments and especially filaments of cellulose acetate or other organic derivatives of cellulose, it is of advantage to cut a compact bundle of filaments which has been wetted with water. Such wetting may again be facilitated by means of the substances of the present invention.

As dispersing agents the substances are particularly of value in the conversion of water-insoluble dyestuffs into dispersions for use in dyeing, printing and stencilling of textile fibres, and in particular fibres of cellulose acetate or other organic derivatives of cellulose, for which the water-insoluble dyestuffs are to-day of most value. The substances may also be used for the purpose of dispersing lakes, insoluble pigments and pigment dyestuffs into suitable dispersions for use as aqueous paints and the like.

As de-electrifiers the compounds have most importance in connection with textile fibres which are liable to electrification, as for example silk, wool and the organic esters and ethers of cellulose, and also in the treatment of films, sheets and the like of esters or of ethers of cellulose or other substances which are liable to electrification. In the case of artificial filaments or other materials such as those made of cellulose derivatives the de-electrifiers of the present invention may be applied to the materials after manufacture or dissolved or dispersed in the solutions used in the manufacture of the materials.

While in the above description particular examples have been given of wet treatments of textiles, powdered solids and other materials, it will be appreciated that the invention is by no means limited thereto. Similarly, particular examples have been given of agents to be used according to the invention, but it is to be understood that the invention includes broadly the use of substances obtainable by acidylation and/or esterification of amino acids and the salts of such products, and particularly of products which contain a relatively large number of carbon atoms, for instance 4 or 6 or more carbon atoms, in the acidyl or ester groups in addition to those present in the parent amino acid. Furthermore, instead of using the condensation products of the amino acids with higher fatty acids or other acids as dispersing, wetting or emulsifying agents, de-electrifiers and the like, I have found that the simple addition products and their metal salts may be used, e. g.

the compounds formed by allowing a metal salt of an amino acid to react with, or add itself to, a higher fatty acid or other acid.

The following examples of the use of the compounds are given by way of illustration, but it is to be clearly understood that they do not limit the invention in any way:—

Example 1

This example shows the use of the substances in the dyeing of artificial silk.

1½ ounces of 1-methylamino anthraquinone are ground with about 6 ounces of the sodium salt of sarkosin naphthenate, and the mixture is well stirred into about 30 gals. of water at 30°–35° C. 10 lbs. of cellulose acetate yarn in hank form are then entered, the temperature raised very slowly to 75°–80° C. and the goods worked until the desired shade is obtained. They are then removed, rinsed and dried, or treated in any other desired manner.

Example 2

Cellulose acetate filaments or yarns are passed through or otherwise impregnated with a 1.5% solution of the sodium salt of the compound obtained by reacting an approximately equimolecular mixture of glycine, oleic acid and concentrated sulphuric acid, and maintaining the temperature at 100°–150° C., i. e. a sulphonated glycine oleic acid compound. The materials are then found to have improved properties for textile processes. The term "ester forming agent" employed hereinafter in the claims denotes agents capable of forming esters by reaction with alcohols, i. e. acidylating agents, as well as esterifying agents such as the alcohols themselves.

What I claim and desire to secure by Letters Patent is:—

1. In the manufacture of textile materials, by a process involving a wetting out, sizing, lubricating, de-electrifying or dispersing operation, effecting said operation with the aid of a medium containing a condensation product of an aliphatic amino carboxylic acid with an ester-forming agent.

2. In the manufacture of textile materials, by a process involving a wetting out, sizing, lubricating, de-electrifying or dispersing operation, effecting said operation with the aid of a medium containing a condensation product of an aliphatic amino carboxylic acid with an acidylating agent containing at least eight carbon atoms.

3. In the manufacture of textile materials, by a process involving a wetting out, sizing, lubricating, de-electrifying or dispersing operation, effecting said operation with the aid of a medium containing a condensation product of an aliphatic amino carboxylic acid with an acidylating agent containing at least eight carbon atoms, said condensation product containing at least twelve carbon atoms.

4. In the manufacture of textile materials, by a process involving a wetting out, sizing, lubricating, de-electrifying or dispersing operation, effecting said operation with the aid of a medium containing a condensation product of an aliphatic amino carboxylic acid with a naphthenic acid.

5. In the manufacture of textile materials, by a process involving a wetting out, sizing, lubricating, de-electrifying or dispersing operation, effecting said operation with the aid of a medium containing a sulphonated condensation product of an aliphatic amino carboxylic acid with a naphthenic acid.

6. In the manufacture of textile materials comprising organic derivatives of cellulose, by a process involving a wetting out, sizing, lubricating, de-electrifying or dispersing operation, effecting said operation with the aid of a medium containing a sulphonated condensation product of an aliphatic amino carboxylic acid with a naphthenic acid.

7. In the manufacture of textile materials comprising cellulose acetate, by a process involving a wetting out, sizing, lubricating, de-electrifying or dispersing operation, effecting said operation with the aid of a medium containing a sulphonated condensation product of an aliphatic amino carboxylic acid with a naphthenic acid.

8. In the manufacture of textile materials comprising cellulose acetate, dyeing the materials by means of a dispersion containing a dyestuff and a sulphonated condensation product of an aliphatic amino carboxylic acid with a naphthenic acid.

9. In the manufacture of textile materials, by a process involving a wetting out, sizing, lubricating de-electrifying or dispersing operation, effecting said operation with the aid of a medium containing a condensation product of an aliphatic amino carboxylic acid with a resin acid.

10. In the manufacture of textile materials, by a process involving a wetting out, sizing, lubricating, de-electrifying or dispersing operation, effecting said operation with the aid of a medium containing a sulphonated condensation product of an aliphatic amino carboxylic acid with a resin acid.

11. In the manufacture of textile materials comprising organic derivatives of cellulose, by a process involving a wetting out, sizing, lubricating, de-electrifying or dispersing operation, effecting said operation with the aid of a medium containing a sulphonated condensation product of an aliphatic amino carboxylic acid with a resin acid.

12. In the manufacture of textile materials comprising cellulose acetate, by a process involving a wetting out, sizing, lubricating, de-electrifying or dispersing operation, effecting said operation with the aid of a medium containing a sulphonated condensation product of an aliphatic amino carboxylic acid with a resin acid.

13. In the manufacture of textile materials comprising cellulose acetate, dyeing the materials by means of dispersions containing dyestuffs and a sulphonated condensation product of an aliphatic amino carboxylic acid with a resin acid.

14. In the manufacture of textile materials, by a process involving a wetting out, sizing, lubricating, de-electrifying or dispersing operation, effecting said operation with the aid of a medium containing a condensation product of an aliphatic amino carboxylic acid with an esterifying agent containing at least four carbon atoms.

15. In the manufacture of textile materials, by a process involving a wetting out, sizing, lubricating, de-electrifying or dispersing operation, effecting said operation with the aid of a medium containing a condensation product of an aliphatic amino carboxylic acid with an esterifying agent containing at least four carbon atoms, said condensation product containing at least twelve carbon atoms.

16. In the manufacture of textile materials, by a process involving a wetting out, sizing, lubricating, de-electrifying or dispersing operation, effecting said operation with the aid of a medium containing an acidylated condensation product of an aliphatic amino carboxylic acid with an esterifying agent containing at least four carbon atoms, said condensation product containing at least twelve carbon atoms.

17. In the manufacture of textile materials comprising organic derivatives of cellulose, by a process involving a wetting out, sizing, lubricating, de-electrifying or dispersing operation, effecting said operation with the aid of a medium containing an acidylated condensation product of an aliphatic amino carboxylic acid with an esterifying agent containing at least four carbon atoms, said condensation product containing at least twelve carbon atoms.

18. In the manufacture of textile materials comprising cellulose acetate, by a process involving a wetting out, sizing, lubricating, de-electrifying or dispersing operation, effecting said operation with the aid of a medium containing an acidylated condensation product of an aliphatic amino carboxylic acid with an esterifying agent containing at least four carbon atoms, said condensation product containing at least twelve carbon atoms.

19. In the manufacture of textile materials comprising cellulose acetate, dyeing the materials by means of dispersions containing dyestuffs and an acidylated condensation product of an aliphatic amino carboxylic acid with an esterifying agent containing at least four carbon atoms, said condensation product containing at least twelve carbon atoms.

HENRY DREYFUS.